(12) United States Patent
Hietaniemi et al.

(10) Patent No.: US 11,655,593 B2
(45) Date of Patent: May 23, 2023

(54) METHOD FOR MANUFACTURING MULTI-LAYERED FIBROUS WEB AND MULTI-LAYERED FIBROUS WEB

(71) Applicant: Kemira Oyj, Helsinki (FI)

(72) Inventors: Matti Hietaniemi, Espoo (FI); Asko Karppi, Espoo (FI); Jukka Rautiainen, Espoo (FI)

(73) Assignee: Kemira Oyj, Helsinki (FI)

( * ) Notice: Subject to any disclaimer, the term of this patent is extended or adjusted under 35 U.S.C. 154(b) by 161 days.

(21) Appl. No.: 17/252,295

(22) PCT Filed: Jul. 10, 2019

(86) PCT No.: PCT/FI2019/050540
§ 371 (c)(1),
(2) Date: Dec. 15, 2020

(87) PCT Pub. No.: WO2020/012074
PCT Pub. Date: Jan. 16, 2020

(65) Prior Publication Data
US 2021/0262169 A1    Aug. 26, 2021

(30) Foreign Application Priority Data
Jul. 12, 2018  (FI) ...................................... 20185639

(51) Int. Cl.
| | |
|---|---|
| *D21H 11/08* | (2006.01) |
| *D21H 11/14* | (2006.01) |
| *D21H 17/29* | (2006.01) |
| *D21H 17/37* | (2006.01) |
| *D21H 17/55* | (2006.01) |
| *D21H 27/00* | (2006.01) |
| *D21H 27/10* | (2006.01) |
| *D21H 27/30* | (2006.01) |

(52) U.S. Cl.
CPC .............. *D21H 11/08* (2013.01); *D21H 11/14* (2013.01); *D21H 17/29* (2013.01); *D21H 17/375* (2013.01); *D21H 17/55* (2013.01); *D21H 27/005* (2013.01); *D21H 27/10* (2013.01); *D21H 27/30* (2013.01)

(58) Field of Classification Search
CPC ...... D21H 17/19; D21H 27/005; D21H 17/28; D21H 11/08; D21H 21/22; D21H 21/18; D21H 17/375; D21H 17/55; D21H 27/30; D21H 27/10; D21H 11/14
USPC ......................................................... 162/100
See application file for complete search history.

(56) References Cited

U.S. PATENT DOCUMENTS

| | | |
|---|---|---|
| 5,032,226 A | 7/1991 | Winiker |
| 2008/0004405 A1 | 1/2008 | Mori et al. |
| 2012/0073773 A1 | 3/2012 | Jehn-Rendu et al. |
| 2012/0241114 A1 | 9/2012 | Axrup et al. |
| 2012/0255693 A1 | 10/2012 | Druecke et al. |
| 2016/0145810 A1 | 5/2016 | Miller, IV et al. |
| 2016/0222590 A1 | 8/2016 | Zhu et al. |

FOREIGN PATENT DOCUMENTS

| | | |
|---|---|---|
| EP | 2926363 A1 | 9/2015 |
| JP | H0551895 A | 3/1993 |
| JP | 2002294595 A | 10/2004 |
| WO | 9606698 A1 | 2/1998 |
| WO | 2013127731 A1 | 9/2013 |
| WO | 2014076372 A1 | 5/2014 |
| WO | 2016034776 A1 | 3/2016 |
| WO | 2017162920 A1 | 9/2017 |
| WO | 2018055239 A1 | 3/2018 |

OTHER PUBLICATIONS

Search report in corresponding Chinese patent application 2019800408187, dated Mar. 2, 2022, 3 pages.

*Primary Examiner* — Mark Halpern
(74) *Attorney, Agent, or Firm* — Meunier Carlin & Curfman LLC

(57) ABSTRACT

A method for manufacturing a multi-layered fibrous web is disclosed, which includes at least two fibrous layers, where each layer is formed from one or more fibre stocks. The fibrous layers are combined prior to subjecting the multi-layered fibrous web to wet-pressing and drying. At least one layer of the multi-layered fibrous web is formed from a fibre stock including at least 50 weight-% of a chemi-thermomechanical pulp (CTMP), a hardwood kraft pulp and/or a recycled fibre material calculated from a thick stock applied to a particular layer approach system. A first strength component and a second strength component are added to the fibre stock. The first strength component includes a cationic strength agent and the second strength component includes a synthetic amphoteric polymer composition having a net charge from −3 to +1 meq/g (dry), at a pH of 7.

18 Claims, No Drawings

METHOD FOR MANUFACTURING MULTI-LAYERED FIBROUS WEB AND MULTI-LAYERED FIBROUS WEB

PRIORITY

This application is a U.S. national application of the international application number PCT/FI2019/050540 filed on Jul. 10, 2019 and claiming priority of FI application number 20185639 filed on Jul. 12, 2018, the contents of all of which are incorporated herein by reference.

FIELD OF THE INVENTION

The present invention relates to a method for manufacturing multi-layered fibrous web, and multi-layered fibrous web according to the preambles of the independent claims presented below.

BACKGROUND OF THE INVENTION

Multi-layered or multi-ply fibrous web comprises at least two fibrous layers which are joined together during manufacturing. The advantages of the multi-layered fibrous layer construct lie in the ability to optimize e.g. fibre characteristics in the different layers to reach certain functionalities. This may be done e.g. by varying the content and quality of the fibre stock in each layer or by treating fibre stock to improve strength.

Most of the properties are directly or indirectly dependent on the type and the characteristics of the fibres. By mixing mechanical and chemical fibres in multi-layered structures, it can be tailoring the end use demands to the final product properties. A complication is that some of the demands are entirely contradictory, such as to obtain high bulk and strength with a given fibre composition. The bulk and strength properties have typically negative correlation, the adequate strength may be a problem when fibre stock properties are modified, and bulk is improved.

The multi-layered tissue and towel grades are typical example for the products, which require high bulk for softness of the final product and good strength properties for adequate functioning of the product during use. The cationic strength agents are commonly used for improving strength properties, but they may decrease bulk and therefore e.g. reducing softness in case of tissue products.

Further, the anionic strength agents may be used for improving strength properties. However, the anionic strength agents affect cationic demand of the process and thus they may negatively affect to drainage and retention. Due to demands for both stiffness and the strength properties on the multi-layered fibrous web, there is a constant need to find strength systems for multi-layered fibrous web which improve strength properties and at least maintain bulk constant.

SUMMARY OF THE INVENTION

It is an object of the present invention to reduce or even eliminate the above-mentioned problems appearing in prior art.

An object of the invention is to provide a strength system for use in manufacturing of multi-layered fibrous web that improves strength properties, such as e.g. z-directional tensile strength, burst strength and/or Scott bond, when using high bulk fibre stock.

It is an object of the invention to provide a method for manufacturing multi-layered fibrous web with improved strength properties and simultaneously maintain high bulk or even improve bulk. Especially, it is an object to provide manufacturing method, wherein at least the centre ply or plies of the multi-layered fibrous web are treated for obtaining desired properties of the final multi-layered web.

In order to achieve among others the object presented above, the invention is characterized by what is presented in the characterizing parts of the enclosed independent claims. Some preferred embodiments of the invention will be described in the other claims.

The embodiments and advantages mentioned in this text relate, where applicable, both to the multi-layered fibrous web, the method as well as to the uses according to the invention, even though it is not always specifically mentioned.

A typical method according to the invention relates to a manufacturing of the multi-layered fibrous web which comprises at least two fibrous layers, wherein each of the layer is formed from one or more fibre stocks, the fibrous layers are combined prior to subjecting the multilayered fibrous web to wet-pressing and drying. In a typical method according to the invention, at least one layer of the multi-layered fibrous web is formed from the fibre stock comprising at least 50 weight-% of chemi-thermomechanical pulp (CTMP), hardwood kraft pulp and/or recycled fibre material calculated from the solids content of the thick stock applied to the particular layer approach system, and to which fibre stock is added a first strength component and a second strength component, wherein the first strength component comprises a cationic strength agent and the second strength component comprises a synthetic amphoteric polymer composition having a net charge from −3 to +1 meq/g (dry), at pH 7.

A multi-layered fibrous web according to an embodiment of the present invention comprises at least two fibrous layers and is produced by using a method according to the present invention.

A multi-layered fibrous web according to an embodiment of the present invention comprises at least two fibrous layers, wherein the multi-layered fibrous web comprises
- at least 50 weight-% of chemi-thermomechanical pulp (CTMP), hardwood kraft pulp and/or recycled fibre material, and
- a first strength component and a second strength component, wherein the first strength component comprises a cationic strength agent, and the second strength component comprises a synthetic amphoteric polymer composition having a net charge from −3 to +1 meq/g (dry) at pH 7, and the multi-layered fibrous web has z-directional tensile strength at least 100 kPa and bulk at least 0.7 cm$^3$/g, preferably >1.5 cm$^3$/g, more preferably >2.0 cm$^3$/g and most preferably in the range of 2-4 cm$^3$/g.

The multi-layered fibrous web according to the present invention may be tissue, towel, paperboard, packaging paper or the like, which comprises at least two fibrous layers combined to each other.

Now, it has been found that in the case of high bulk fibre stock comprising at least 50 weight-% of chemi-thermomechanical pulp (CTMP), hardwood kraft pulp and/or recycled fibre material, the strength properties of the multi-layered fibrous web product may be improved by using synthetic amphoteric polymer composition in combination with cationic strength agent as the strength agent and simultaneously maintain high bulk or even improve bulk.

By using the method according to the invention, any of the following strength properties may be improved separately or simultaneously without decreasing bulk: z-directional tensile strength, tensile strength, tensile stiffness, elastic modulus, burst strength, compression strength measured by Short-Span Compressive Test (SCT), Concora medium test (CMT) value, and Scott bond.

A method according to the present invention especially provides improved strength of a multi-layered fibrous web comprising at least two fibrous layers and having bulk at least 0.7 cm$^3$/g, preferably >1.5 cm$^3$/g, more preferably >2.0 cm$^3$/g or >2.5 cm$^3$/g determined according to the standard ISO 534. In a preferred embodiment, a multi-layered fibrous web comprising at least two fibrous layers has bulk in the range of 2-4 cm$^3$/g. Especially, z-directional tensile strength of the multi-layered fibrous web is improved by the method according to the invention. The z-directional tensile strength is defined as force required to produce unit area fracture perpendicular to the plane of board (kPa).

In the method according to the invention a cationic strength agent is used as the first strength component and a synthetic amphoteric polymer composition having the specified net charge is used as the second strength component. A synthetic amphoteric polymer composition may retain on the fibers by itself, but a cationic strength agent is observed to be required for providing interaction with the synthetic amphoteric polymer composition to create the improved strength effect.

To be able to substantially fully utilise the potential of the method according to the present invention, it is advantageous that the multi-layered fibrous web consists of at least three layers or plies. In an embodiment of the present invention, the multi-layered fibrous web comprises at least two layers and preferably at least three layers or plies, wherein at least the centre ply or plies of the multi-layered fibrous web are treated for obtaining desired properties of the multi-layered fibrous web.

The present invention is especially useful in production of tissue and towel grades, which require high bulk for softness of the final product and good strength properties for adequate functioning of the product during use. Now, the fibre stock comprising at least hardwood kraft pulp may be used for providing adequate softness, and the strength properties are achieved by the combination of the cationic strength agent and the specified synthetic amphoteric polymer composition.

The method according to the present invention provides suitable zeta potential level for the process by a synthetic amphoteric polymer composition although adding significant amounts of first strength component. This improves runnability and providing proper drainage and formation. Further, the foaming problems may be eliminated by using the method according to the invention.

DETAILED DESCRIPTION OF THE INVENTION

In the present invention description, the terms "a multi-layered fibrous web", "a multi-layered web", and "a multi-ply web" refer to a multi-layered fibrous web comprises at least two fibrous layers. A number of the layers of the multi-layered fibrous web is not limited, but the method according to the present invention is applicable for all kind of the multi-layered fibrous web structures irrespective of the number and quality of the layers. According to one preferred embodiment, the multi-layered fibrous web comprises at least three layers or plies.

A method according to the invention is suitable for use in any kind of forming units for forming fibrous layers and joining the fibrous layers together prior to subjecting the multilayered fibrous web to wet-pressing and drying for obtaining a multi-layered fibrous web. Multi-layered fibrous web may contain a different kind of fibre stock in each layer, wherein fibrous layers of the multi-layered fibrous web may be formed from separate fibre stocks. Each of the layer of the multi-layered fibrous web may be formed from one or more fibre stocks. At least one layer of the multi-layered fibrous web is formed from the fibre stock in which the first strength component and the second strength component according to the present invention has added. In the present context, the term "fibre stock" is understood as an aqueous suspension, which comprises fibres and optionally fillers. According to the present invention, at least one layer of the multi-layered fibrous web is formed from the fibre stock comprising at least 50 weight-% of chemi-thermomechanical pulp (CTMP), hardwood kraft pulp and/or recycled fibre material calculated from the solids content of the thick stock applied to the particular layer approach system, to which layer a first strength component and a second strength component are added.

In the present invention, the fibrous layers are combined on a wire section of the machine and/or by using multi-layered headbox. According to the invention the fibrous layers are joined together, when the dryness of the fibrous layers is <15%. According to an embodiment of the invention, a multi-layered fibrous web is manufactured from fibrous layers formed by multiple separate forming units, wherein each of the wet fibrous layer, is formed from a fibre stock by using own forming unit and at least part of water is drained on a wire section, and the formed fibrous webs are joined together and the joined fibrous webs are subjected to further draining, wet-pressing and drying for obtaining the multi-layered fibrous web. The forming unit refers to any arrangement which may be used to form wet fibrous layer or web from fibre stock, and with which arrangement separate wet fibrous layers are first formed on the wire or the like and in the later stage the separate at least partly drained fibrous layers are joined to multi-layered fibrous web. The forming unit may comprise a head box or a cylinder former. According to an embodiment a multi-layered fibrous web, or one or more layers of the multi-layered fibrous web may be formed by using multilayer headbox. According to an embodiment of the invention, one or more layers of the multi-layered fibrous web may also be formed by using forming units so that at least fibrous layer is a lip flow of headbox or a jet of headbox. Therefore, one layer of the multi-layered fibrous web may be manufactured from fibrous web formed by forming unit, wherein fibrous web or layer is formed from a fibre stock and at least part of water is drained on a wire section from it, and then another fibrous layer is applied on the surface of the at least partly drained fibrous web and the joined fibrous layers are subjected to further draining, wet-pressing and drying for obtaining the multi-layered fibrous web. Another fibrous layer applied on the surface of the first layer is not necessarily subjected to the draining prior to joining. In an embodiment according to the invention, the combined multi-layered web is subjected to vacuum watering phase prior to wet-pressing.

A first strength component according to the invention comprises a cationic strength agent. According to an embodiment of the invention, the first strength component comprises cationic strength agent, which comprises cationic starch, synthetic cationic strength polymer or a combination of them. The synthetic cationic strength polymer may comprise cationic polyacrylamide, glyoxylated polyacrylamide (GPAM), polyvinylamine, polyamidoamine epichlorohydrin (PAE), or any combination thereof. In a preferred embodiment, the synthetic cationic strength polymer comprises cationic polyacrylamide and/or glyoxylated polyacrylamide (GPAM), since they provide advantageously low cationicity which provides good strength properties with a synthetic amphoteric composition. A synthetic cationic strength polymer may be any cationic polymer comprising cationic monomers. In an embodiment, synthetic cationic strength polymer may be homo- or copolymers of at least one cationic monomer, such as copolymers comprising acrylamide and at least one cationic monomer, or homopolymers of cationic monomers. According to an embodiment of the invention, the glyoxylated polyacrylamide (GPAM) may be glyoxylated homo- or copolymers of at least one cationic monomer, or glyoxylated polyvinylamines. In an embodiment, the cationic monomer may be selected from 2-(dimethylamino)ethyl acrylate (ADAM), [2-(acryloyloxy)ethyl]trimethylammonium chloride (ADAM-CI), 2-(dimethylamino)ethyl acrylate benzylchloride, 2-(dimethylamino)ethyl acrylate dimethylsulphate, 2-dimethylaminoethyl methacrylate (MADAM), [2-(methacryloyloxy)ethyl]trimethylammonium chloride (MADAM-CI), 2-dimethylaminoethyl methacrylate dimethylsulphate, [3-(acryloylamino)propyl]trimethylammonium chloride (APTAC), [3-(methacryloylamino)propyl]trimethylammonium chloride (MAPTAC), diallyldimethylammonium chloride (DADMAC) and any combination thereof. According to an embodiment of the invention, polyvinylamines refer to homo- or copolymers of N-vinylformamide fully or partially hydrolysed into vinylamine, or homo- or copolymers of (meth)acrylamide monomers fully or partially Hofmann degraded into vinylamine.

In a preferred embodiment of the invention the cationic strength agent comprises cationic starch. The cationic starch may be cationic non-degraded starch having degree of cationic substitution (DS) of 0.01-0.06. Preferably the cationic starch comprises potato, corn or tapioca starch. It is advantageous to use the cationic strength agent comprising cationic starch as the first strength component since it provides good strength effect in cost-effective manner.

According to an embodiment of the invention, the cationic strength agent has a cationic net charge at pH 7. In an embodiment of the invention, the cationic strength agent may have a net charge <3 meq/g (dry), at pH 7. In case of cationic strength agent comprises cationic starch, synthetic cationic strength polymer and/or glyoxylated polyacrylamide (GPAM), the net charge may be <2 meq/g (dry), at pH 7. In an embodiment of the invention, the cationic strength agent may have a net charge in the range from 0.2 to 3 meq/g (dry), preferably from 0.5 to 2 meq/g (dry), at pH 7. The above specified net charges of the cationic strength agent provide an optimal interaction of the cationic strength agent and the synthetic amphoteric composition and therefore improved strength properties.

In an embodiment according to the present invention, the synthetic cationic strength polymer may have a weight average molecular weight MW in the range of 300 000-3 000 000 Da, typically 300 000-2 000 000 Da or 300 000-1 000 000 Da for providing desired function of the cationic strength agent. The strength of the multi-layered fibrous web tends to weaken if the molecular weight of the cationic strength agent is too low. Too high molecular weight may cause flocculation and so affecting negatively to the strength properties. Especially, the cationic strength agent with the specified weight average molecular weight and net charge is used in the method according to the invention. The weight average molecular weight MW is determined by size-exclusion chromatography (SEC) using Agilent 1100 SE chromatography equipment with integrated pump, autosampler and degasser. Eluent is a buffer solution (0.3125 M $CH_3COOH$+0.3125 M $CH_3COONa$) with a flow rate of 0.5 ml/min at 35° C. Typical sample concentration is 2-4 mg/ml, with an injection volume of 50 µl. Ethylene glycol (1 mg/ml) is used as a flow marker. Column set consists of three columns (a TSKge PWXL guard column and two TSKge GMPWXL columns). Refractive index detector by Agilent is used for detection (T=35° C.). Molecular weight is determined using conventional (column) calibration with poly (ethylene oxide)/poly(ethylene glycol) narrow molecular weight distribution standards (Polymer Standards Service).

The cationic strength agent to be used in the method according to the invention is selected e.g. on the basis of the fibre stock and the desired properties of the final multi-layered fibrous web. In the exemplary embodiments, the cationic strength agent comprising cationic starch may be used in fibre stocks comprising chemi-thermomechanical pulp, whereas the synthetic cationic strength polymers, glyoxylated polyacrylamide (GPAM), polyvinylamines and/or PAE may be advantageously used in fibre stocks comprising recycled fibres. In an embodiment, the synthetic cationic strength polymers may be advantageously used when the fibre stock originates mainly in recycled fibres, such as mixed office waste (MOW). The glyoxylated polyacrylamides, cationic polyacrylamides and/or polyvinylamines may be preferably used in fibre stocks originates mainly from undeinked recycled fibres.

In addition to a cationic strength agent as the first strength component, a second strength component comprising a synthetic amphoteric polymer composition is added to the fibre stock. According to an embodiment of the invention a synthetic amphoteric polymer composition may comprise any synthetic amphoteric polymer composition or it may comprise a mixture of the synthetic amphoteric polymer compositions. In the present invention, a synthetic amphoteric polymer composition means that said composition has anionic and cationic charges present at pH 7. According to the present invention, a second strength component comprises a synthetic amphoteric polymer composition having a net charge from −3 to +1 meq/g (dry), at pH 7. Preferably, the synthetic amphoteric polymer composition may have a net charge in the range from −2 to +0.7 meq/g (dry), preferably from −1.5 to +0.35 meq/g (dry), and more preferably −1.5 to −0.05 (dry) at pH 7. According to a preferred embodiment, the synthetic amphoteric polymer composition is net anionic at pH 7 for providing optimal interactions with a cationic strength agent and thereby optimal strength effect. According to an embodiment, the synthetic amphoteric polymer composition may have a net charge in the range from +0.05 to +2.0 meq/g, preferably from +0.1 to +1.5 meq/g, and more preferably from +0.1 to +1.0 meq/g, at pH 2.7. It has been observed that a synthetic amphoteric polymer composition reduces a risk for formation of the flocks, which may affect negatively to the strength, when a net charge of the synthetic amphoteric polymer composition is in the above defined ranges.

According to an embodiment of the present invention, a second strength composition comprising a synthetic amphoteric polymer composition, which comprises amphoteric vinyl copolymer. The amphoteric vinyl copolymer comprises at least anionic vinyl monomer and cationic vinyl monomer, and optionally non-ionic vinyl monomer.

According to another embodiment the amphoteric vinyl copolymer may comprise
- 1-40 mol-%, preferably 1.5-35 mol-% or 4-30 mol-% of anionic monomers, 0.1-20 mol-%, preferably 0.2-20 mol-%, more preferably 0.5-15 mol-%, and even more preferably 0.5-10 mol-% or 0.5-8 mol-% of cationic monomers, and
- 50-98 mol-%, preferably 60-98 mol-% and more preferably 85-98 mol-% of non-ionic monomers, for providing improved strength properties and simultaneously maintain high bulk or even improve bulk of the multi-layered multi-layered fibrous web.

According to another embodiment of the invention, the synthetic amphoteric polymer composition comprises a combination of a copolymer comprising anionic vinyl monomer and non-ionic vinyl monomers and a copolymer comprising cationic vinyl monomers and non-ionic vinyl monomers. The vinyl copolymers may also comprise other than vinyl monomers, wherein the copolymers comprise both vinyl monomers and non-vinyl monomers.

According to an embodiment of the invention the synthetic amphoteric polymer composition comprises
- one or more copolymers of anionic vinyl monomers, cationic vinyl monomers and non-ionic vinyl monomers, and/or
- a combination of a copolymer comprising anionic vinyl monomer and non-ionic vinyl monomers and a copolymer comprising cationic vinyl monomers and non-ionic vinyl monomers.

The cationic groups in the synthetic amphoteric polymer composition may originate from monomers selected from 2-(dimethylamino)ethyl acrylate (ADAM), [2-(acryloyloxy)ethyl]trimethylammonium chloride (ADAM-Cl), 2-(dimethylamino)ethyl acrylate benzylchlorde, 2-(dimethylamino)ethyl acrylate dimethylsulphate, 2-dimethylaminoethyl methacrylate (MADAM), [2-(methacryloyloxy)ethyl]trimethylammonium chloride (MADAM-Cl), 2-dimethylaminoethyl methacrylate dimethylsulphate, [3-(acryloylamino)propyl]trimethylammonium chloride (APTAC), [3-(methacryloylamino)propyl]trimethylammonium chloride (MAPTAC), and diallyldimethylammonium chloride (DADMAC). Preferably the cationic groups in the synthetic amphoteric polymer composition may originate from monomers selected from [2-(acryloyloxy)ethyl]trimethylammonium chloride (ADAM-Cl), [3-(acryloylamino)propyl]trimethylammonium chloride (APTAC), and [3-(methacryloylamino)propyl]trimethylammonium chloride (MAPTAC). According to an embodiment of the invention, the cationic groups in the synthetic amphoteric polymer composition may also originate from nonionic N-vinylcarboxamide monomers hydrolysed into vinylamine groups or nonionic (meth)acrylamide monomers Hofmann degraded into vinylamine groups.

The anionic groups in the synthetic amphoteric polymer composition may originate from monomers selected from unsaturated mono- or dicarboxylic acids, such as acrylic acid, maleic acid, fumaric acid, itaconic acid, aconitic acid, mesaconic acid, citraconic acid, crotonic acid, isocrotonic acid, angelic acid or tiglic acid. Preferably the anionic groups originate from acrylic acid or itaconic acid.

Exemplary non-ionic vinyl monomers in the synthetic amphoteric polymer composition comprise acrylamide-based monomers such as (meth)acrylamide, dialkylaminoalkyl (meth)acrylamides, for example dialkylaminopropyl (meth)acrylamides, hydrophobically derivatized acrylamide-based monomers such as N-tert-butylacrylamide (TBAm), N-octadecylacrylamide (ODAm), N-diphenylmethylacrylamide (DPMAm), or N-isopropylacrylamide (NIPAM); acrylate-based monomers such as alkyl (meth)acrylates, alkoxyalkyl (meth)acrylates, dialkylaminoalkyl (meth)acrylates, for example dimethylaminoethyl (meth)acrylate; N-vinylcarbamides such as N-vinylformamide; styrene; acrylonitrile; vinyl acetate; N-vinylpyrrolidone; N-vinyl-2-caprolactam; maleic anhydride; vinylethers such as 2-hydroxybutylvinylether; or any combinations thereof. Especially, non-ionic monomers may comprise acrylamide-based monomers, particularly acrylamide.

The synthetic amphoteric polymer composition may be a dry powder, a solution polymer, an emulsion polymer and/or a dispersion polymer. According to the present invention, the synthetic amphoteric polymer composition is applied as aqueous solutions. Typically, the dry powder is dissolved to water in order to obtain 0.1-3 weight-% or 0.3-1 weight-% polymeric solution before use. The synthetic amphoteric polymer compositions are in dissolved form in the aqueous solutions. Preferably, the synthetic amphoteric polymer compositions according to the present invention are water-soluble.

In an embodiment according to the invention, the synthetic amphoteric polymer composition may have
- a viscosity of 2.0-1000 mPas, preferably 2.5-300 mPas, measured at 1 weight-% concentration at 25° C. and pH 2.7, using Brookfield LV DVI viscometer with small sample adapter, and
- a viscosity of 2.5-2000 mPas, preferably 3.5-1000 mPas, measured at 1 weight-% concentration at 25° C. and pH 7, using Brookfield LV DVI viscometer with small sample adapter.

A viscosity increase of the synthetic amphoteric polymer composition, when pH changes from 2.7 to 7, characterizes the synthetic amphoteric polymer ability to interact with ionic bonds with other amphoteric polymer molecules thereby increasing dimensions of the polymer complex, i.e. increasing size of polymer complex, which is believed to be beneficial for strength especially in high bulk stock where the distance between fibres is greater.

According to an embodiment of the invention, pH of the synthetic amphoteric polymer composition is adjusted before dosing to the fibre stock, preferably pH is adjusted to be at least 3.0 and more preferably in the range of 3.0-7.0, wherein the both of the cationic and anionic groups are present in the composition and the interaction with the cationic strength agent and the fibres is desired when added to fibre stock. In another embodiment, pH is adjusted to be at least 3.3. The pH of the synthetic amphoteric polymer composition may be adjusted by adding dilution water and/or acids or bases.

In an embodiment of the invention, the first strength component and the second strength component are added separately to the fibre stock in order that the first added component mixed to the fibre stock prior to addition of the second component for improving strength effect. If mixed simultaneously or pre-mixed, they might be form complex. According to one preferred embodiment the first strength component, i.e. the first strength component comprising a cationic strength agent is added first to the fibre stock prior to the second strength component. But in some application, e.g. in case of high cationic demand, it may be useful to add the second strength component prior to the first strength component. In an embodiment the first strength component and the second strength component may also be added sequentially to the fibre stock.

According to the present invention at least one of the strength components is added to thick stock. In an embodiment of the invention, at least the first strength component, i.e. the first strength component comprising a cationic strength agent may be added to thick stock. Thick stock is here understood as a fibrous stock or furnish, which has consistency of at least 20 g/I, preferably more than 25 g/I, more preferably more than 30 g/I. In an embodiment according to the invention, both strength components, i.e. a first strength component and a second strength component, are added to thick stock. According to one embodiment, the addition of a strength component is located after the stock storage towers, but before thick stock is diluted.

According to the present invention, at least one layer of the multi-layered fibrous web is formed from the fibre stock comprising at least 50 weight-% of chemi-thermomechanical pulp (CTMP), hardwood kraft pulp and/or recycled fibre material calculated from the solids contents of the thick stock applied to the particular layer approach system, to which layer a first strength component and a second strength component are added. A fibre stock may comprise old corrugated container (OCC) pulp or mixed office waste (MOW). According to an embodiment of the invention, the recycled fibre material comprises undeinked recycled fibres. A composition of the fibre stock is selected on the basis of the product to be manufactured. For example, chemi-thermomechanical pulp (CTMP) may be used when producing multi-layered fibrous web, such as folding boxboard, liquid packaging board or wall paper. Recycled fibre materials are advantageously used when producing multi-layered fibrous web, such as white lined chip board, testliner, fluting coreboard, gypsum board liner or white top liner. Whereas hardwood kraft pulp is typically used in tissue manufacturing. In an embodiment of the invention for manufacturing multi-layered tissue web, the fibre stock may comprise recycled fibre materials and hardwood kraft pulp. In tissue application, the fibre stock may comprise 90-100 weight-% hardwood kraft pulp depending on the desired features of the final tissue product.

When layers of the multi-layered fibrous web have been produced from the fibre stocks comprising different characteristics, the desired internal bond strength between the layers might be a problem. In an embodiment of the invention, a first strength component and second strength component may be added to the fibre stock having highest bulk value, measured from a hand sheet made from the thick stock just before applying to the approach system, since the high bulk suspension may require cationic starch for binding fibres and so providing strength properties. In an embodiment, the treated layer is the one made from the fibre stock having bulk value at least 0.7 $cm^3/g$ and preferably at least 2 $cm^3/g$, measured from a hand sheet made from the thick stock just before applying to the approach system. Bulk value is determined in a handsheet made of thick stock according to standard method. In an embodiment according to the invention, bulk is at least 0.7 $cm^3/g$, preferably >1.5 $cm^3/g$, more preferably >2.0 $cm^3/g$ or >2.5 $cm^3/g$, determined according to ISO 534 from handsheets made by Rapid Kötchen sheet former used according to method in accordance with ISO 5269-2:2012. In a preferred embodiment, bulk is in the range of 2-4 $cm^3/g$, determined according to ISO 534 from handsheets made by Rapid Kötchen sheet former used according to method in accordance with ISO 5269-2:2012.

The multi-layered fibrous web according to the invention comprises at least two layers, wherein at least one layer is treated by the method according to the invention. To be able to substantially fully utilise the potential of the method according to the present invention, it may be advantageous that the multi-layered fibrous web consists of at least three layers or plies. According to an embodiment of the invention, the multi-layered fibrous web comprising at least three layers or plies and at least one centre ply of the multi-layered fibrous web comprises added first strength component and second strength component according to the invention. According to one embodiment of the invention, the multi-layered fibrous web comprises three layers and the centre ply between the top ply and back ply comprises added first strength component and second strength component according to the invention. In an embodiment, the first strength component and the second strength component according to the invention are added to the fibre stock from which is formed the layer which may affect mostly to possible delamination of the final product. In an embodiment, the first strength component and the second strength component are added to the fibre stock from which is formed the layer which is in the middle of the final multi-layered fibrous web when calculated in relation to the grammage of the multi-layered fibrous web.

An amount of the cationic strength agent to be added is dependent on e.g. the composition of the cationic strength agent, fibre stock and the required characteristics of the multi-layered fibrous web to be produced. In an embodiment of the invention, a cationic strength agent is added in an amount of 0.6-18 kg/ton of fibre stock as dry. When cationic starch is used as a cationic strength agent, it may be added in an amount of 3-18 kg/ton of fibre stock as dry. When synthetic cationic strength polymer is used as a cationic strength agent, it may be added in an amount of 0.6-5 kg/ton of fibre stock as dry. Correspondingly, an amount of a synthetic amphoteric polymer composition to be added is dependent on e.g. the composition of the synthetic amphoteric polymer composition, fibre stock and the required characteristics of the multi-layered fibrous web to be produced. In an embodiment of the invention, a synthetic amphoteric polymer composition may be added in an amount of 0.3-5 kg/ton of fibre stock as dry, preferably 0.5-3 kg/ton of fibre stock as dry.

In addition of the first and second strength component according to the invention, other commonly used inorganic microparticles, sizing agents, and/or fixatives may also be added to the fibre stock.

According to the present invention a multi-layered fibrous web may be any multi-layered fibrous web. Typically, the multi-layered fibrous web may be tissue, towel, paperboard or packaging paper. The invention is particularly advantageously implemented when forming paperboards, such as folding boxboard, liquid packaging board, white top liner, kraft liner, test liner, fluting board, core board, cupboard, solid bleached board or white lined chipboard. Typical multi-layered paperboards such as folding boxboard (FBB), liquid packaging board and white lined chipboard (WLCB) require good ply bond measured as Scott bond or z-directional tensile strength or IGT dry pick or Dennison wax test and bending stiffness, wherein the method according to the present invention is suitable for these paperboards. Further, the method according to the present invention is especially suitable for tissue and towel production, since it provides both softness and strength properties.

In some embodiments of the invention, the multi-layered fibrous web may further comprise a coating containing mineral pigments, and off-set printing. The method according to the invention is especially useful in multi-layered fibrous webs, which are further subjected to the coating and/or printing, since then it is possible to prevent or even eliminate delamination problems.

EXPERIMENTAL

The following examples are merely illustrative of the principles and practices of the present invention and are not intended to limit the scope of the invention.

The methods, devices and standards used for pulp characterisation and sheet testing in the following experiments are presented in Tables 1 and 2. The characteristics of the strength component comprising a synthetic amphoteric polymer composition used in the following experiments are presented in Table 3.

TABLE 1

Pulp characterization devices and standards

| Property | Device/Standard |
|---|---|
| pH | Knick Portamess 911 |
| Turbidity (NTU) | WTW Turb 555IR |
| Conductivity (mS/cm) | Knick Portamess 911 |
| Charge (μekv/l) | Mütek PCD 03 |
| Zeta potential (mV) | Mütek SZP-06 |
| Consistency (g/l) | ISO 4119 |

TABLE 2

Sheet testing devices and standard methods used for produced paper sheets.

| Measurement | Device | Standard |
|---|---|---|
| Basis weight | Mettler Toledo | ISO 536 |
| Ash content, 525° C. | — | ISO 1762 |
| Scott bond | Huygen | Tappi T 569 |
| Z-directional tensile (ZDT) | Lorentzen & Wettre | ISO 15754 |
| Taber, bending stiffness | Lorentzen & Wettre | Tappi T 489 om-08 |
| Tensile strength, elastic modulus | Lorentzen & Wettre | ISO 1924-3 |

Viscosity values of the synthetic amphoteric polymer compositions presented at Table 3 are determined at 1.0% polymer concentration at pH 2.7 and at 7.0 and at 25° C. by using Brookfield LV DVI SSA viscometer with small sample adapter. Dry polymer products AMPH-1, AMPH-2, AMPH-3, AMPH-6, AMPH-7, AMPH-8 and AMPH-13 were dissolved in de-ionized water by stirring 75 min with a magnetic stirred at 600 rpm at 25° C. Aqueous solution products AMPH-20, AMPH-30 and AMPH-86 were diluted with de-ionized water. The pH of the solution was adjusted with sulfuric acid (96%) or sodium hydroxide (32%).

Starch was used as cationic strength chemical in the following application examples. Starch was cationic potato starch having degree of substitution (DS) 0.035. Starch was dissolved by cooking at 97° C. for 30 min at 1% concentration. Retention chemical was cationic polyacrylamide (CPAM) FennoPol K 3500P from Kemira Oyj. CPAM in dry powder form was dissolved to 0.5% concentration.

Application Example 1

This example simulates the preparation of tissue paper, fine paper, kraft paper or a surface layer for multi-ply board.

Test fibre stock was chemical hardwood pulp, which was bleached birch kraft pulp refined at 2% consistency to 25° Shopper Riegler in Valley Hollander. Pulp was diluted with deionized water, which conductivity was adjusted to 1.5 mS/cm level by addition of NaCl.

In hand sheet preparation, the used chemicals were added to the test fibre stock in a dynamic drainage jar under mixing, 1000 rpm. Cationic strength chemical was diluted before dosing to 0.2 weight-% concentration. Amphoteric strength chemical and retention chemical were diluted to 0.05 weight-% concentration before dosing. pH of the amphoteric strength chemical was 3.5 when added to fibre stock. The used strength chemicals and their addition times are given in Table 4. In addition to the strength chemicals the

TABLE 3

Characteristics of the synthetic amphoteric polymer compositions

| | Non-ionic monomers, mol-% | Anionic monomers, mol-% | Cationic monomers, mol-% | Viscosity of 1% solution at pH 2.7, mPas | Viscosity of 1% solution at pH 7.0, mPas | Charge density at pH 2.7, meq/g | Charge density at pH 7.0, meq/g |
|---|---|---|---|---|---|---|---|
| AMPH-1 | 89 | 7 | 4 | 32 | 200 | 0.5 | −0.4 |
| AMPH-2 | 89 | 7 | 4 | 197 | 228 | 0.5 | −0.4 |
| AMPH-3 | 89 | 7 | 4 | 76 | 228 | 0.5 | −0.4 |
| AMPH-6 | 89 | 7 | 4 | 142 | 374 | 0.5 | −0.4 |
| AMPH-7 | 91 | 6 | 3 | 89 | 214 | 0.4 | −0.4 |
| AMPH-8 | 91 | 6 | 3 | 75 | 371 | 0.4 | −0.4 |
| AMPH-13 | 91 | 6 | 3 | 82 | 396 | 0.4 | −0.4 |
| AMPH-20 | 87 | 8 | 5 | 4 | 12 | 0.6 | −0.2 |
| AMPH-30 | 77 | 7 | 16 | 7 | 3 | 1.8 | 0.3 |
| AMPH-86 | 92 | 5 | 3 | 3 | 4 | 0.4 | −0.2 | retention chemical, CPAM, was dosed at dosage of 0.03 kg/t 10 s prior to sheet making. All chemical amounts are given as kg dry active chemical per ton dry fibre stock.

Handsheets having basis weight of 80 g/m² were formed by using Rapid Köthen sheet former with 1.5 mS/cm conductivity in backwater, adjusted with NaCl, in accordance with the standard ISO 5269-2:2012. The handsheets were dried in vacuum dryers for 6 minutes at 92° C., at 1000 mbar. Before testing the handsheets were pre-conditioned for 24 h at 23° C. in 50% relative humidity, according to the standard ISO 187.

Test fibre stock was diluted to 0.6% consistency with deionized water, pH was adjusted to 7, and NaCl salt was added to obtain conductivity of 1.5 mS/cm. The obtained pulp mixture was added to Formette. Chemical additions were made to mixing tank of Formette according to Table 5. pH of the amphoteric strength chemical was 3.5 when added to fibre stock. All chemical amounts are given as kg dry chemical per ton dry fibre stock. Water was drained out after all the pulp was sprayed. Drum was operated with 1400 rpm, mixer for pulp 400 rpm, pulp pump 1100 rpm/min, number of sweeps 100 and scoop time was 60 s. Sheet was removed

TABLE 4

Hand sheet tests of application example 1: chemical additions and measured results.

| | Time, s | | | | | | | | |
|---|---|---|---|---|---|---|---|---|---|
| Test | −60 Starch [kg/t dry] | −30 AMPH-20 [kg/t dry] | −30 AMPH-1 [kg/t dry] | −30 AMPH-86 [kg/t dry] | −30 AMPH-30 [kg/t dry] | Bulk [cm³/g] | Tensile index [Nm/g] | Tensile stiffness index | Modulus of elasticity [Gpa] | SCT index [Nm/g] |
| 1 | 0 | | | | | 1.5 | 50 | 7.2 | 4.9 | 29.7 |
| 2 | | 2.5 | | | | 1.4 | 58 | 7.4 | 5.2 | 31.9 |
| 3 | | 5 | | | | 1.4 | 62 | 7.2 | 5.0 | 31.8 |
| 4 | 9.5 | | | | | 1.4 | 62 | 7.3 | 5.2 | 31.4 |
| 5 | 9.5 | | 0.75 | | | 1.4 | 64 | 7.4 | 5.3 | 31.2 |
| 6 | 9.5 | | | 2.5 | | 1.4 | 63 | 7.4 | 5.2 | 33.5 |
| 7 | 9.5 | | | | 0.75 | 1.4 | 66 | 7.5 | 5.2 | 32.2 |
| 8 | 9.5 | | | | 1.5 | 1.4 | 67 | 7.4 | 5.2 | 31.4 |
| 9 | 9.5 | | | | 2.5 | 1.4 | 66 | 7.5 | 5.2 | 32.6 |

Application Example 2

This example simulates the preparation of the middle ply of multi-ply board, such as folding box board or liquid packaging board. Test sheets were made with Formette-dynamic hand sheet former manufactured by Techpap.

Test fibre stock was made from 80% of bleached dried CTMP having Canadian standard Freeness of 580 ml and from 20% of dry base paper broke from manufacture of folding box board. Test pulp was disintegrated according to the standard ISO 5263:1995, at 80° C.

from drum between wire and 1 blotting paper on the other side of the sheet. Wetted blotting paper and wire were removed. Sheets were wet pressed at Techpap nip press with 5 bar pressure with 2 passes having new blotting paper each side of the sheet before each pass. Dry content was determined from the pressed sheet by weighting part of the sheet and drying the part in oven for 4 hours at 110° C. Sheets were dried in restrained condition in drum dryer. Drum temperature was adjusted to 92° C. and passing time to min. Two passes were made. First pass with between blotting papers and second pass without. Before testing in the laboratory sheets were pre-conditioned for 24 h at 23° C. in 50% relative humidity, according to the standard ISO 187.

TABLE 5

| | time, s | | | | | | | | | |
|---|---|---|---|---|---|---|---|---|---|---|
| Test | −60 Starch [kg/t dry] | −30 AMPH-1 [kg/t dry] | −30 AMPH-2 [kg/t dry] | −30 AMPH-3 [kg/t dry] | −30 AMPH-86 [kg/t dry] | −30 AMPH-30 [kg/t dry] | Dryness after pressing [%] | ZDT [kPa] | Bulk [cm³/g] | Tensile ind GM [Nm/g] |
| 1 | 0 | | | | | | 48 | 96 | 3.1 | 12 |
| 2 | 5 | | | | | | 43 | 105 | 3.2 | 14 |
| 3 | 5 | 0.5 | | | | | 48 | 123 | 3.2 | 15 |
| 4 | 5 | | 0.5 | | | | 48 | 115 | 3.2 | 15 |
| 5 | 5 | | | 0.5 | | | 50 | 107 | 3.3 | 14 |
| 6 | 5 | | | | 0.5 | | 52 | 107 | 3.1 | 16 |
| 7 | 14.3 | | | | | | | 151 | 3.1 | 18 |
| 8 | 14.3 | 0.5 | | | | | | 177 | 3.2 | 19 |
| 9 | 14.3 | | 0.5 | | | | | 166 | 3.1 | 18 |
| 10 | 14.3 | 1.5 | | | | | | 158 | 3.1 | 20 |
| 11 | 14.3 | | 1.5 | | | | | 174 | 3.0 | 20 |
| 12 | 14.3 | | | 1.5 | | | | 185 | 3.1 | 21 |
| 13 | 14.3 | | | | 0.5 | | | 166 | 3.1 | 19 |
| 14 | 14.3 | | | | 1.5 | | | 180 | 3.0 | 20 |
| 15 | 14.3 | | | | | 3 | | 179 | 3.1 | 19 |

Application Example 3

The present example simulates preparation of tissue paper, fine paper, kraft paper or a surface layer for multi-ply board.

Test fibre stock was made from 80% of bleached dried CTMP having Canadian standard Freeness of 580 ml and from 20% of dry base paper broke from manufacture of folding box board. Test pulp was disintegrated according to ISO 5263:1995, at 80° C. Test fibre stock was diluted to 0.6% consistency with deionized water, pH was adjusted to 7, and NaCl salt was added to obtain conductivity of 1.5 mS/cm.

In hand sheet preparation the used chemicals were added to the test fibre stock in a dynamic drainage jar under mixing, 1000 rpm. Cationic strength chemical was diluted before dosing to 0.2 weight-% concentration. Amphoteric strength chemical and retention chemical were diluted to 0.05 weight-% concentration before dosing. pH of the amphoteric strength chemical was 3.5 when added to fibre stock. The used strength chemicals and their addition times are given in Table 6. In addition to the strength chemicals the retention chemical, CPAM, was dosed at dosage of 0.03 kg/t 10 s prior to sheet making. All chemical amounts are given as kg dry active chemical per ton dry fibre stock.

Handsheets having basis weight of 110 g/m$^2$ were formed by using Rapid Köthen sheet former with 1.5 mS/cm conductivity in backwater, adjusted with NaCl, in accordance with the standard ISO 5269-2:2012. The handsheets were dried in vacuum dryers for 6 minutes at 92° C., at 1000 mbar. Before testing the handsheets were pre-conditioned for 24 h at 23° C. in 50% relative humidity, according to the standard ISO 187.

TABLE 6

| | time, s | | | | | | | | | Modulus | |
| --- | --- | --- | --- | --- | --- | --- | --- | --- | --- | --- | --- |
| Test | −60 Starch [kg/t dry] | −30 AMPH-3 [kg/t dry] | −30 AMPH-6 [kg/t dry] | −30 AMPH-7 [kg/t dry] | −30 AMPH-8 [kg/t dry] | −30 AMPH-13 [kg/t dry] | −30 AMPH-20 [kg/t dry] | Bulk [cm$^3$/g] | Tensile index MD [Nm/g] | of elasticity MD [GPa] | ZDT [kPa] |
| 1 | | | | | | | | 2.21 | 16 | 1.4 | 250 |
| 2 | 10 | 0 | | | | | | 2.15 | 20 | 1.7 | 405 |
| 3 | 10 | 1 | | | | | | 2.16 | 23 | 1.8 | 415 |
| 4 | 10 | 2 | | | | | | 2.17 | 22 | 1.7 | 431 |
| 5 | 10 | | 1 | | | | | 2.17 | 22 | 1.7 | 422 |
| 6 | 10 | | 2 | | | | | 2.16 | 22 | 1.8 | 424 |
| 7 | 10 | | | 2 | | | | 2.17 | 21 | 1.7 | 428 |
| 8 | 10 | | | | 2 | | | 2.17 | 23 | 1.7 | 450 |
| 9 | 10 | | | | | 1 | | 2.17 | 23 | 1.8 | 423 |
| 10 | 10 | | | | | 2 | | 2.16 | 23 | 1.8 | 428 |
| 11 | 10 | | | | | | 1 | 2.18 | 24 | 1.8 | 440 |
| 12 | 10 | | | | | | 2 | 2.16 | 25 | 1.8 | 473 |

Summary of the Application Examples

As a summary of the application examples, the method according to the present invention, wherein both the cationic strength agent and the synthetic amphoteric polymer composition are added to fibre stock, improves at least z-directional tensile strength without decreasing bulk. Tensile strength and modulus of elasticity are also improved with the method according to invention. Improving the tensile strength or modulus of elasticity in weakest ply of multi-layered board can be beneficial to reduce folding cracking. Elastic modulus improvement improves the bending stiffness of multi-layered board.

The invention claimed is:

1. A method for manufacturing a multi-layered fibrous web, which comprises at least two fibrous layers, wherein each layer is formed from one or more fibre stocks, the fibrous layers are combined prior to subjecting the multi-layered fibrous web to wet-pressing and drying, said method comprising:
    forming at least one layer of the multi-layered fibrous web from a fibre stock comprising at least 50 weight-% of a chemi-thermomechanical pulp (CTMP), a hardwood kraft pulp and/or a recycled fibre material calculated from solid contents of a thick stock applied to a particular layer approach system; and
    adding a first strength component and a second strength component to the fibre stock,
    wherein the first strength component comprises a cationic strength agent and the second strength component comprises a synthetic amphoteric polymer composition having a net charge from −3 to +1 meq/g (dry), at a pH of 7.

2. The method according to claim 1, wherein the cationic strength agent comprises cationic starch, a synthetic cationic strength polymer, or a combination of them.

3. The method according to claim 2, wherein the synthetic cationic strength polymer comprises cationic polyacrylamide, glyoxylated polyacrylamide (GPAM), polyvinylamine, polyamidoamine epichlorohydrin (PAE) or any combination thereof.

4. The method according to claim 1, wherein the cationic strength agent has a cationic net charge at pH 7.

5. The method according to claim 1, wherein the cationic strength agent has a weight-average molecular weight MW in a range of 300,000-3,000,000 Da.

6. The method according to claim 1, wherein the cationic strength agent comprises cationic starch.

7. The method according to claim 1, wherein the synthetic amphoteric polymer composition has a net charge from −2 to +0.7 meq/g (dry).

8. The method according to claim 1, wherein the synthetic amphoteric polymer composition has a net charge from +0.05 to +2.0 meq/g.

9. The method according to claim 1, wherein the synthetic amphoteric polymer composition has:
- a viscosity of 2.0-1000 mPas, measured at a 1.0 weight-% concentration at 25° C. and a pH of 2.7, using a Brookfield LV DVI SSA viscometer with a small sample adapter, and
- a viscosity of 2.5-2000 mPas, measured at a 1 weight-% concentration at 25° C. and a pH of 7, using a Brookfield LV DVI viscometer with a small sample adapter.

10. The method according to claim 1, wherein the synthetic amphoteric polymer composition comprises an amphoteric vinyl copolymer.

11. The method according to claim 10, wherein the amphoteric vinyl copolymer comprises 1-40 mol-% of anionic monomers, 0.1-20 mol-% of cationic monomers, and 50-98 mol-% of non-ionic monomers.

12. The method according to claim 1, wherein the synthetic amphoteric polymer composition comprises:
- one or more copolymers of anionic vinyl monomers, cationic vinyl monomers and non-ionic vinyl monomers; and/or
- a combination of a copolymer comprising anionic vinyl monomer and non-ionic vinyl monomers and a copolymer comprising cationic vinyl monomers and non-ionic vinyl monomers.

13. The method according to claim 1, wherein pH of the synthetic amphoteric polymer composition is adjusted to be at least 3.0 before dosing to the fibre stock.

14. The method according to claim 1, wherein the first strength component and the second strength component are added separately to the fibre stock.

15. The method according to claim 1, wherein the first strength component is added to the fibre stock prior to the second strength component.

16. The method according to claim 1, wherein at least the first strength component is added to thick stock.

17. The method according to claim 1, wherein the recycled fibre material comprises undeinked recycled fibres.

18. The method according to claim 1, wherein the fibre stock has a bulk value of at least 0.7 $cm^3/g$, measured from a hand sheet made from the thick stock just before applying to the approach system.

* * * * *